No. 806,423. PATENTED DEC. 5, 1905.
H. S. MILLS.
LENS HOLDER.
APPLICATION FILED AUG. 7, 1905.

2 SHEETS—SHEET 1.

Witnesses:
John Enders.
Chas. H. Buell.

Inventor.
Herbert S. Mills,
By Dyrenforth, Dyrenforth & Lee
Attys.

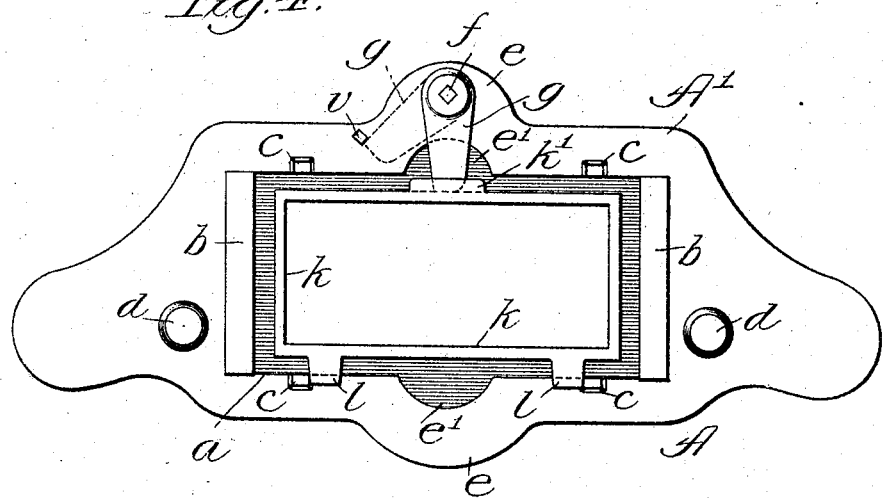
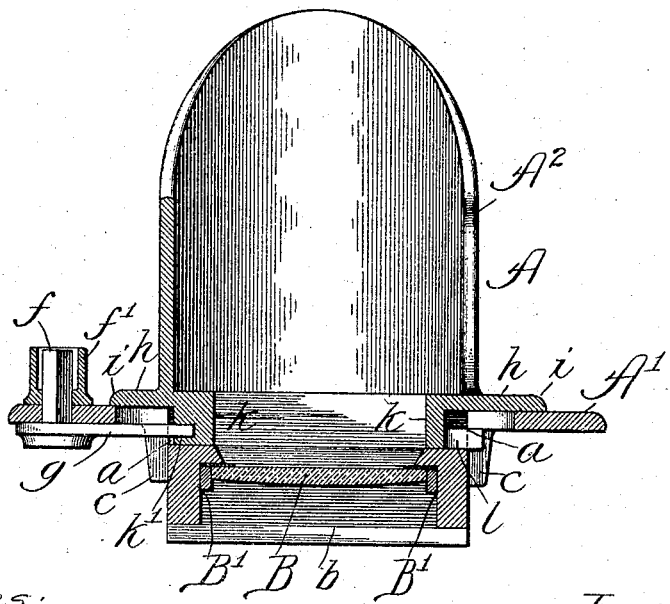

UNITED STATES PATENT OFFICE.

HERBERT S. MILLS, OF CHICAGO, ILLINOIS.

LENS-HOLDER.

No. 806,423.  Specification of Letters Patent.  Patented Dec. 5, 1905.

Application filed August 7, 1905. Serial No. 273,043.

*To all whom it may concern:*

Be it known that I, HERBERT S. MILLS, a citizen of the United States, residing at Chicago, in the county of Cook and State of Illinois, have invented a new and useful Improvement in Lens-Holders, of which the following is a specification.

The object of my invention is to provide a construction of holder for the lenses used on stereoscopes of the class in which pictures to be exhibited are inclosed in a case to which the lens-holder is secured, and particularly of the coin-controlled picture-exhibiting variety, whereby the lenses may be readily released from their confined position to permit convenient access to them for cleaning. In the coin-operated picture-exhibitors referred to it is the more common practice to secure the lenses in place immovably on the case, thereby rendering access to their inner surfaces, which become blurred with use, for cleaning purposes practically possible only through the case by opening it, and the operation is attended with considerable difficulty and inconvenience. My improvement avoids this objection by rendering the lenses readily releasable from their operative position in the case and as readily replaceable therein to permit free access to all parts of the lenses for cleaning them.

Figure 1:
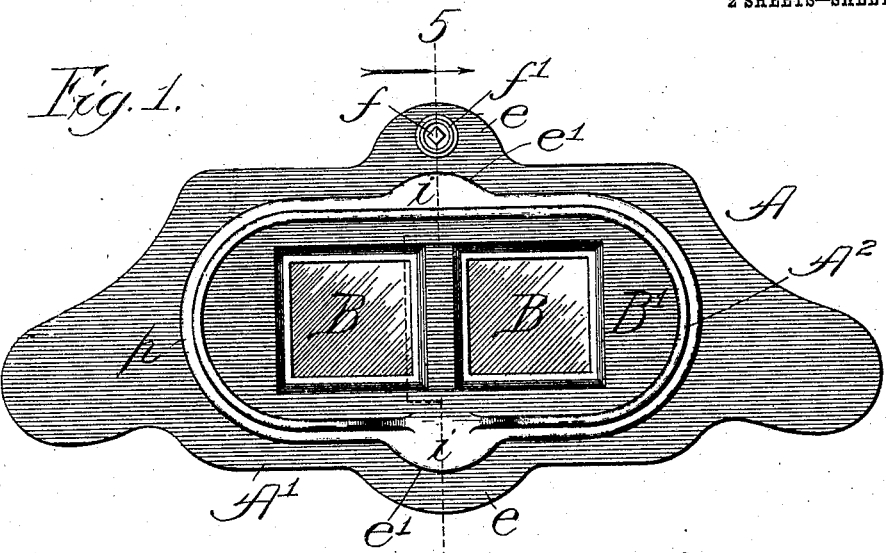
Figure 2:
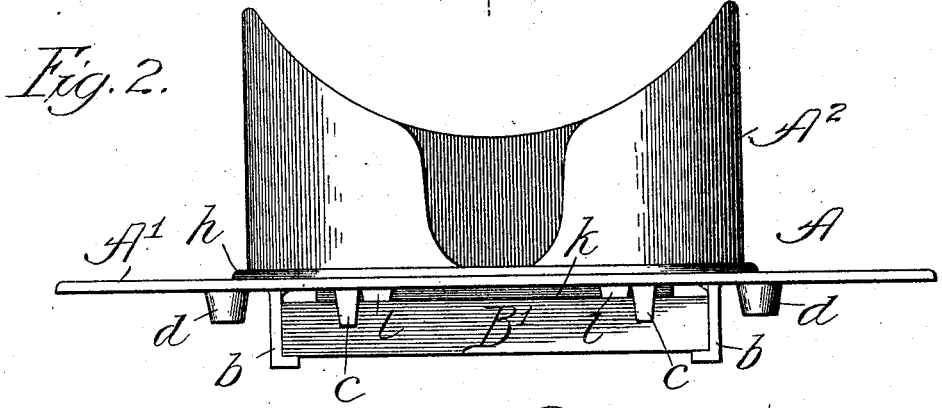
Figure 3:
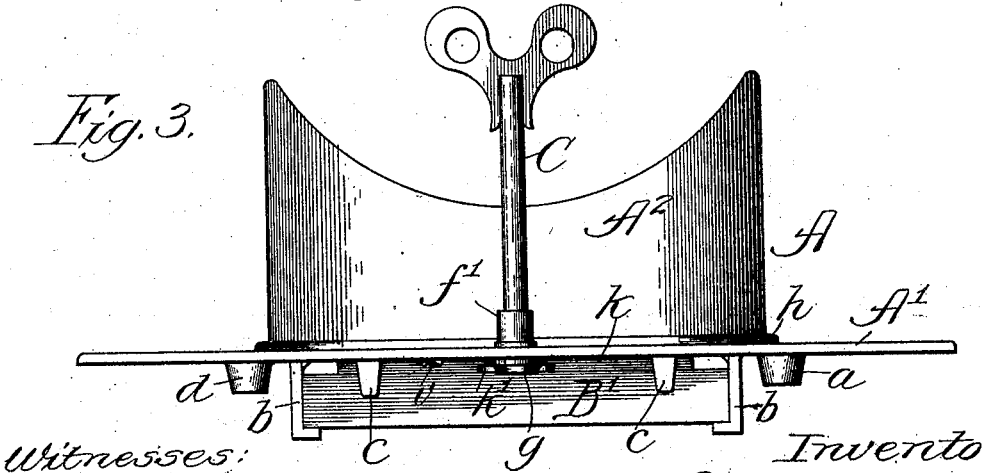

Referring to the accompanying drawings, Figure 1 is a view of my improved device in front elevation. Fig. 2 shows the same regarded from underneath Fig. 1. Fig. 3 is a top view representing the side of the device opposite that presented in Fig. 2 and showing the unlocking-key in place; Fig. 4, a view of the holder in rear elevation or regarded from its inner end with the lenses removed to disclose details which would be hidden by their containing-frame; and Fig. 5, a section taken at the line 5 in Fig. 1 and viewed in the direction of the arrow.

A denotes the holder as a whole, and B B are the stereoscopic lenses in the frame B', usually formed of wood. The holder comprises as its preferred construction for embodying my invention a bed-plate A', to be permanently secured in place on a picture-inclosing case (not shown) and on which the lenses are seated, and a shield A², adapted to be releasably locked on the bed-plate to cover the lens-frame and secure it in the holder. The bed-plate contains an opening $a$, preferably of the shape of the lens-frame, and has depending adjacent to the ends of the opening brackets $b$, on which the frame B' rests at its ends, and lugs $c$, depending from the bed-plate at opposite sides of the opening therein, form stops to confine the lens-frame at its upper and lower edges. The studs $d\ d$, shown projecting from the inner face of the plate A', are provided to be let into suitable openings in the aforesaid case for fastening the holder in place in a well-known manner. The bed-plate has curved projections $e\ e$ extending coincident with each other from opposite sides of the transverse center of the opening $a$, and the inner edges of these projections are concaved to form arc-shaped recesses $e'\ e'$, for the purpose hereinafter described. In one (the uppermost) of the projections $e$ is journaled an arbor $f$, carrying on its inner end a tongue $g$ and surrounded about its outer end by a socket $f'$ to receive a key C, applied to the arbor for turning the tongue.

The shield A², which is preferably of the usual general form, is provided about its base with an outwardly-projecting seating-flange $h$, at which it rests upon the bed-plate, the flange having curved projections $i\ i$ to register with the bed-plate projections $e$ and cover the recesses $e'$ in the latter. About the open bottom of the shield, the opening in which is of smaller dimensions than those of the lens-frame, is formed a marginal flange $k$ of the shape of the opening, which is shown to be rectangular. On the upper side of the flange $k$ is formed a recess $k'$, Fig. 5, to register with the arbor $f$, and on the opposite lower side of said flange are provided lugs $l\ l$ to pass under or behind the adjacent edge of the bed-plate.

To assemble the parts, with the bed-plate secured in position in the case and the tongue $g$ turned to the dotted position in Fig. 4 against a stop $v$, limiting its movement, the lens-frame is introduced through the opening $a$ upon its seat afforded by the brackets $b$, the operator holding the frame at its sides between his thumb and a finger, which may enter the opening $a$ at the recesses $e'$, both for inserting and withdrawing said frame. Thereupon the shield member of the holder is applied by introducing the lugs $l$ under the inner edge of the lower margin of the opening $a$, thereby bringing the recess $k'$ into position to receive the tongue $g$ when the key is applied to turn the arbor and introduce the tongue into the recess, thus locking the shield member in place. The operator removes the key, which is retained in the possession of those having authority to use it to prevent its unauthorized use. To remove the lenses, as for cleaning them, the key is applied to turn the tongue $g$ out of engagement with the recess $k'$, which releases the shield member, permitting it to be removed from obstructing the withdrawal of the lenses, which may thereupon be taken out in the manner observed in introducing them upon their seat.

What I claim as new, and desire to secure by Letters Patent, is—

1. In combination, a lens-holder for a picture-exhibiting machine of the character described, comprising a bed-plate adapted to be fastened on the machine-case and provided with an opening, a shield upon the bed-plate, and a frame carrying lenses seated on the bed-plate over said opening and movable into and out of operative position, and a lock on said holder for securing the lenses against unauthorized removal, for the purpose set forth.

2. In combination, a lens-holder for a picture-exhibiting machine of the character described, comprising a bed-plate adapted to be fastened on the machine-case and provided with an opening, a shield releasably connected with the bed-plate, and a frame carrying lenses seated on the bed-plate over said opening and movable into and out of operative position, and a lock on said holder for securing the lenses against unauthorized removal, for the purpose set forth.

3. In combination, a lens-holder for a picture-exhibiting machine of the character described, comprising a bed-plate adapted to be fastened on the machine-case and provided with an opening, and a shield releasably connected with the bed-plate, a frame carrying lenses seated on the bed-plate over said opening and confined on its seat by the shield, and means for locking the shield on the bed-plate.

4. In combination, a lens-holder for a picture-exhibiting machine of the character described, comprising a bed-plate adapted to be fastened on the machine-case and provided with an opening and with seating-brackets and stop-lugs extending from its inner face, and a shield releasably connected with the bed-plate, a frame carrying lenses, seated on said brackets and confined in place by the shield, and means for locking the shield on the bed-plate.

5. In combination, a lens-holder for a picture-exhibiting machine of the character described, comprising a bed-plate adapted to be fastened on the machine-case and provided with an opening forming recesses at opposite sides, seating-brackets and stop-lugs extending from the inner face of the bed-plate, and a shield provided with a base-flange at which it rests on the bed-plate and having projections for covering said recesses, a frame carrying lenses seated on said brackets and confined in place by the shield and means for locking the shield on the bed-plate.

6. In combination a lens-holder for a picture-exhibiting machine of the character described, comprising a bed-plate adapted to be fastened on the machine-case and provided with an opening forming recesses at opposite sides, seating-brackets and stop-lugs extending from the inner face of the bed-plate and a key-arbor carrying a tongue, and a shield having a marginal flange about its opening provided with a recess to receive said tongue, and a frame carrying lenses, seated on said brackets and confined thereon by the shield.

7. In combination, a lens-holder for a picture-exhibiting machine of the character described, comprising a bed-plate adapted to be fastened on the machine-case and provided with an opening forming recesses at opposite sides, seating-brackets and stop-lugs extending from the inner face of the bed-plate and a key-arbor carrying a tongue, and a shield provided with a base-flange at which it rests on the bed-plate and having projections for covering said recesses, and with a marginal flange about the opening in the shield-base provided on one side with a recess to receive said tongue and on its opposite side with lugs to engage the adjacent edge of the bed-plate opening, and a frame carrying lenses, seated on said brackets and confined therein by the shield.

HERBERT S. MILLS.

In presence of—
J. H. LANDES,
A. U. THORIEN.